(12) United States Patent
Honkanen (10) Patent No.: US 9,648,223 B2
(45) Date of Patent: May 9, 2017

(54) LASER BEAM SCANNING ASSISTED AUTOFOCUS

(71) Applicant: Microvision, Inc., Redmond, WA (US)

(72) Inventor: Jari Honkanen, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 26 days.

(21) Appl. No.: 14/845,782

(22) Filed: Sep. 4, 2015

(65) Prior Publication Data

US 2017/0070662 A1    Mar. 9, 2017

(51) Int. Cl.
*H04N 5/232*    (2006.01)
*G03B 21/53*    (2006.01)

(52) U.S. Cl.
CPC ......... *H04N 5/23212* (2013.01); *G03B 21/53* (2013.01)

(58) Field of Classification Search
None
See application file for complete search history.

(56) References Cited

U.S. PATENT DOCUMENTS

| | | | | |
|---|---|---|---|---|
| 5,569,904 A * | 10/1996 | Meyers | ............... | G02B 7/32 250/201.8 |
| 5,752,115 A * | 5/1998 | McIntyre | ............... | G02B 7/32 396/108 |
| 8,072,650 B1 * | 12/2011 | Starns | ............... | H04N 1/02409 348/348 |
| 2001/0003465 A1 * | 6/2001 | Ito | ............... | G02B 7/32 348/345 |
| 2003/0147050 A1 * | 8/2003 | Nakamura | ............... | G02B 5/32 353/31 |
| 2012/0075534 A1 * | 3/2012 | Katz | ............... | H04N 9/3182 348/602 |
| 2013/0021491 A1 * | 1/2013 | Lee | ............... | H04N 19/56 348/222.1 |
| 2014/0078474 A1 * | 3/2014 | Nakao | ............... | H04N 9/3129 353/33 |
| 2014/0160439 A1 * | 6/2014 | Ikeda | ............... | G03B 21/16 353/31 |
| 2015/0331112 A1 * | 11/2015 | Stettner | ............... | G01S 7/4813 701/28 |
| 2015/0341542 A1 * | 11/2015 | Preston | ............... | G03B 13/20 348/346 |
| 2016/0028936 A1 * | 1/2016 | Saphier | ............... | G02B 7/102 348/87 |
| 2016/0248969 A1 * | 8/2016 | Hurd | ............... | H04N 5/23216 |
| 2016/0266467 A1 * | 9/2016 | Lou | ............... | G02B 7/285 |

* cited by examiner

*Primary Examiner* — Timothy J Henn
(74) *Attorney, Agent, or Firm* — Kevin D. Wills (57) ABSTRACT

An apparatus with autofocus includes a scanning laser projector to provide autofocus assist. The scanning laser projector may project visible or nonvisible light in contrasting patterns to provide passive autofocus assist. The scanning laser projector may include a time-of-flight determination circuit to measure distances to provide active autofocus assist. Passive and active autofocus assist are combined to provide hybrid autofocus assist.

17 Claims, 6 Drawing Sheets

LASER BEAM SCANNING ASSISTED AUTOFOCUS

FIELD

The present invention relates generally to autofocus systems, and more specifically to light assisted autofocus systems.

BACKGROUND

Cameras with autofocus typically include an optical system consisting of a sensor, a control system, and a tunable optical element to automatically focus the camera on a selected point or area. Autofocus implementations can be categorized as being active, passive, or a combination of both (hybrid).

Passive autofocus systems typically used in digital single-lens reflex (DSLR) cameras can struggle to achieve accurate focus in low-light and low-contrast situations, while active autofocus systems typically used in fixed lens point and shoot cameras may be limited by a small number of focus points.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Autofocus systems can be categorized as being one of two types: 1) passive or 2) active. Autofocus systems may also be a combination of passive and active, referred to herein as "hybrid" autofocus systems. In general, more expensive digital signal-lens reflex (DSLR) cameras with interchangeable lenses include passive systems while less expensive fixed-lens point-and-shoot cameras often include active systems.

Systems using passive autofocus typically determine the optimal focus by computer analysis of the image itself. During the focusing process, the system analyzes the scene and drives the lens back and forth searching for the best focus.

Passive autofocus systems must have sufficient light to work. In low-light environments there may not be enough contrast for the autofocus sensors and algorithms to find focus. One can experience this limitation when pictures taken in a low light environment with a flash turn out to be out-of-focus due to the autofocus system failing to focus on the intended target.

As further described below, various embodiments of the present invention include embedded laser beam scanning (LBS) projectors that improve the operation of passive autofocus systems. For example, in some embodiments, embedded LBS projectors may increase passive system performance in low-light and low-contrast situations by projecting visible or nonvisible light into the field of view.

Passive autofocus systems also need sufficient detail in the image to provide contrast. One can experience this limitation when trying to take a picture of a blank wall or a large object of uniform color and observing how the camera autofocus keeps hunting back and forth as it cannot see sufficient difference between adjacent pixels to determine best focus.

As further described below, various embodiments of the present invention may include embedded laser beam scanning (LBS) projectors to display a contrasting pattern into the field of view to assist the autofocus system.

Active autofocus systems typically use infrared (IR) light illumination to judge the distance to the subject. Distance measurement implementation can be based on either triangulation or time of flight measurement. Additionally, active IR autofocus systems typically have a single focus point or a very limited number of focus points.

As further described below, various embodiments of the present invention may include embedded laser beam scanning (LBS) projectors with time-of-flight (TOF) measurement capabilities to determine the distance to one or more targets by projecting light (either visible or nonvisible) into the field of view at multiple points. In some embodiments, the location of the focus points may be dynamic, thereby changing the target location used for autofocus.

In some embodiments, an embedded LBS projector that includes red, green, blue, and infrared laser light sources and a time-of-flight (TOF) measurement system combines various aspects of the passive and active autofocus assist to provide hybrid autofocus assist features from a single embedded display module.

Various embodiments are now described with reference to the accompanying figures. Various elements shown in the figures, and described with reference to the figures, may contribute to passive autofocus assist, active autofocus assist, or hybrid autofocus assist. No one figure is limited to passive autofocus assist embodiments, active autofocus assist embodiments, or hybrid autofocus assist embodiments.

Figure 1:
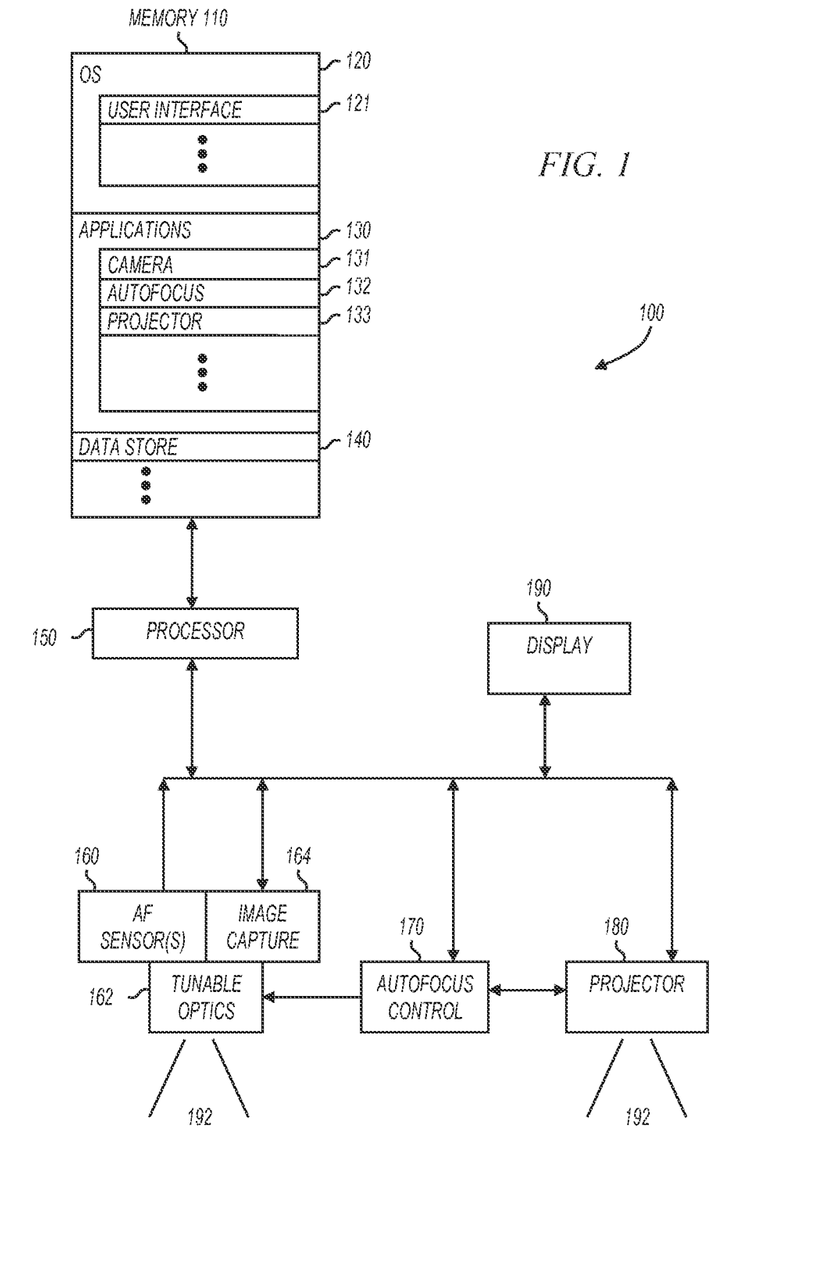
FIG. 1 shows an apparatus with laser beam scanning (LBS) assisted autofocus in accordance with various embodiments of the present invention.

FIG. 1 shows an apparatus with laser beam scanning (LBS) assisted autofocus in accordance with various embodiments of the present invention. Apparatus 100 includes processor 150, memory 110, display 190, projector 180, autofocus control 170, image capture device 164, autofocus sensor(s) 160, and tunable optics 162. Apparatus 100 may be any type of mobile device that includes the components shown. For example, in some embodiments, apparatus 100 may be a mobile phone, a smartphone, a tablet computer, a laptop computer, a camera, a video camera, or the like.

Image capture component 164 captures images from a field of view 192. In some embodiments, image capture component 164 includes a device that captures pixels in a rectilinear grid, such as a complementary metal oxide semiconductor (CMOS) sensor commonly found in digital cameras.

Tunable optics 162 includes one or more focusable optic devices such as a lens. Tunable optics 162 may be tunable by any mechanism such as physical warping of lenses, lateral movement of lenses relative to each other, or any other suitable mechanism. Light from the field of view 192 passes through tunable optics 162 before reaching image capture component 164.

Autofocus sensor(s) 160 are sensors that receive light that passes through tunable optics 162 and attempt to sense whether an image is in focus at a particular point. Examples of autofocus sensors include, but are not limited to, phase detectors and contrast detectors. Autofocus sensors(s) 160 are examples of image analysis components capable of receiving reflected laser light from the field of view, and providing image analysis used to assist autofocus.

Projector 180 projects visible and/or nonvisible light into field of view 192. In some embodiments, projector 180 is a laser beam steering (LBS) projector, also referred to herein as a scanning laser beam projector. Projector 180 is described further below with reference to FIG. 2. Projector 180 may function as a display device as well as an autofocus assist device. For example, projector 180 may display images that have been captured and stored in memory 110. Also for example, projector 180 may project light into field of view 192 to aid in passive autofocus, and may include a TOF measurement system to aid in active autofocus.

Autofocus control 170 functions to tune tunable optics 162. For example, in some embodiments, autofocus control 170 includes circuits to move and/or warp lenses, such as stepper motors. In further embodiments, autofocus control 170 includes a processor that receives information directly from autofocus sensors 160 and/or projector 180. In these embodiments, autofocus control 170 may close a passive/active/hybrid control loop without including processor 150.

Processor 150 may be any type of processor capable of executing instructions stored in memory 110 and capable of interfacing with the various components shown in FIG. 1. For example, processor 150 may be a microprocessor, a digital signal processor, an application specific processor, or the like. In some embodiments, processor 150 is a component within a larger integrated circuit such as a system on chip (SOC) application specific integrated circuit (ASIC).

Processor 150 is an example of image analysis components capable of image data representing reflected laser light from the field of view, and providing image analysis used to assist autofocus. For example, in some embodiments, processor 150 commands projector 180 to project light into the field of view 192, reads information from autofocus sensors 160, and commands autofocus control 170 to tune tunable optics 162. In other embodiments, processor 150 commands projector 180 to project light into the field of view 192, reads image information from 164, performs image analysis, and commands autofocus control 170 to tune tunable optics 162.

In still further embodiments, processor 150 commands projector 180 to project light into the field of view 192, reads distance information from projector 180, and commands autofocus control 170 to tune tunable optics 162.

Display 190 is a display device that presents information to a user. In some embodiments, display 190 also includes a touch sensitive surface, sensor, or set of sensors that accept input from a user. For example, display 190 may detect when and where an object touches the screen, and may also detect movement of an object across the screen. When display 190 detects input, processor 150 (in association with user interface component 121 determine what actions, if any, should be taken in response to the user input.

Display 190 may be manufactured using any applicable display technologies, including for example, liquid crystal display (LCD), active matrix organic light emitting diode (AMOLED), and the like. Further, display 190 may be manufactured using any application touch sensitive input technologies, including for example, capacitive and resistive touch screen technologies, as well as other proximity sensor technologies.

Memory 110 may include any type of memory device. For example, memory 110 may include volatile memory such as static random access memory (SRAM), or nonvolatile memory such as FLASH memory. Memory 110 is encoded with (or has stored therein) one or more software modules (or sets of instructions), that when accessed by processor 150, result in processor 150 performing various functions. In some embodiments, the software modules stored in memory 110 may include an operating system (OS) 120 and applications 130. Applications 130 may include any number or type of applications. Examples provided in FIG. 1 include a camera application 131, an autofocus application 132, and a projector application 133. Memory 110 may also include any amount of space dedicated to data storage 140. Examples of data storage include image storage and video storage.

Operating system 120 may be a mobile device operating system such as an operating system to control a mobile phone, smartphone, tablet computer, laptop computer, camera, video camera, or the like. As shown in FIG. 1, operating system 120 includes user interface component 121. Operating system 120 may include many other components without departing from the scope of the present invention. Further, in some embodiments, operating system 120 is omitted.

User interface component 121 includes processor instructions that cause apparatus 100 to display user interface (UI) screens, icons, and the like. User interface component 121 may also include processor instructions that cause apparatus 100 to recognize user input, and to pass that user input on to applications. For example, user interface component 121 may receive menu selections, icon selections, or the like, and provide those selections to the camera application 131, the autofocus application 132, and/or the projector application 133.

Camera application 131 includes instructions that cause processor 150 to communicate with various elements within apparatus 100 to capture images and/or video. For example, in some embodiments, camera application 131 interacts with a user using display 190 and/or projector 180, and captures images using image capture 164.

Autofocus application 132 includes instructions that cause processor 150 to communicate with various elements within apparatus 100 to perform autofocus. For example, autofocus application 132 may interact with autofocus sensors 160 and autofocus control 170 to perform passive autofocus. Further, in some embodiments, autofocus application 132 may interact with image capture device 164, perform image analysis, and communicate with autofocus control 170 to perform passive autofocus. In still further embodiments, autofocus application 132 may receive distance information from projector 180 and communicate with autofocus control 170 to perform active autofocus.

Projector application 133 includes instructions that cause processor 150 to communicate with projector 180. For example, projector application 133 may communicate with projector 180 to provide image, video, and control data. In some embodiments, projector application 133 provides autofocus assist. For example, in some embodiments, projector application 133 may cause projector 180 to flood the field of view 192 with visible or nonvisible light to assist with passive autofocus. In other embodiments, projector application 133 may cause projector 180 to project a contrasting pattern to assist in passive autofocus. In further embodiments, projector application 133 may cause processor 180 to modify a contrasting pattern either spatially or over time to provide autofocus assist. For example, different contrasting patterns may be projected over different portions of the field of view, different color patterns may be projected into the field of view, or the contrasting pattern may be changed temporally from coarse to fine as the focus system converges to the desired focus setting. In still further embodiments, projector application 133 may cause projector 180 to measure distances to objects at multiple points in the field of view 192 to assist in active autofocus.

Each of the above-identified applications corresponds to a set of instructions for performing one or more functions described above. These applications (sets of instructions) need not be implemented as separate software programs, procedures or modules, and thus various subsets of these applications may be combined or otherwise re-arranged in various embodiments. For example, camera application 131 may be combined with autofocus application 132. Furthermore, memory 110 may store additional applications (e.g., telephone, contacts, music players, video players, etc.) and data structures not described above.

Memory 110 represents a computer-readable medium capable of storing instructions, that when accessed by processor 150, result in the processor performing as described herein. For example, when processor 150 accesses instructions within autofocus application 132, processor 150 provides passive autofocus assist, active autofocus assist, or hybrid autofocus assist using projector 180.

Apparatus 100 may include many other circuits and services that are not specifically shown in FIG. 1. For example, in some embodiments, apparatus 100 may include a global positioning system (GPS) radio, a Bluetooth radio, a cellular radio, haptic feedback devices, audio port(s), video port(s), and the like. Any number and/or type of circuits and services may be included within apparatus 100 without departing from the scope of the present invention.

Figure 2:
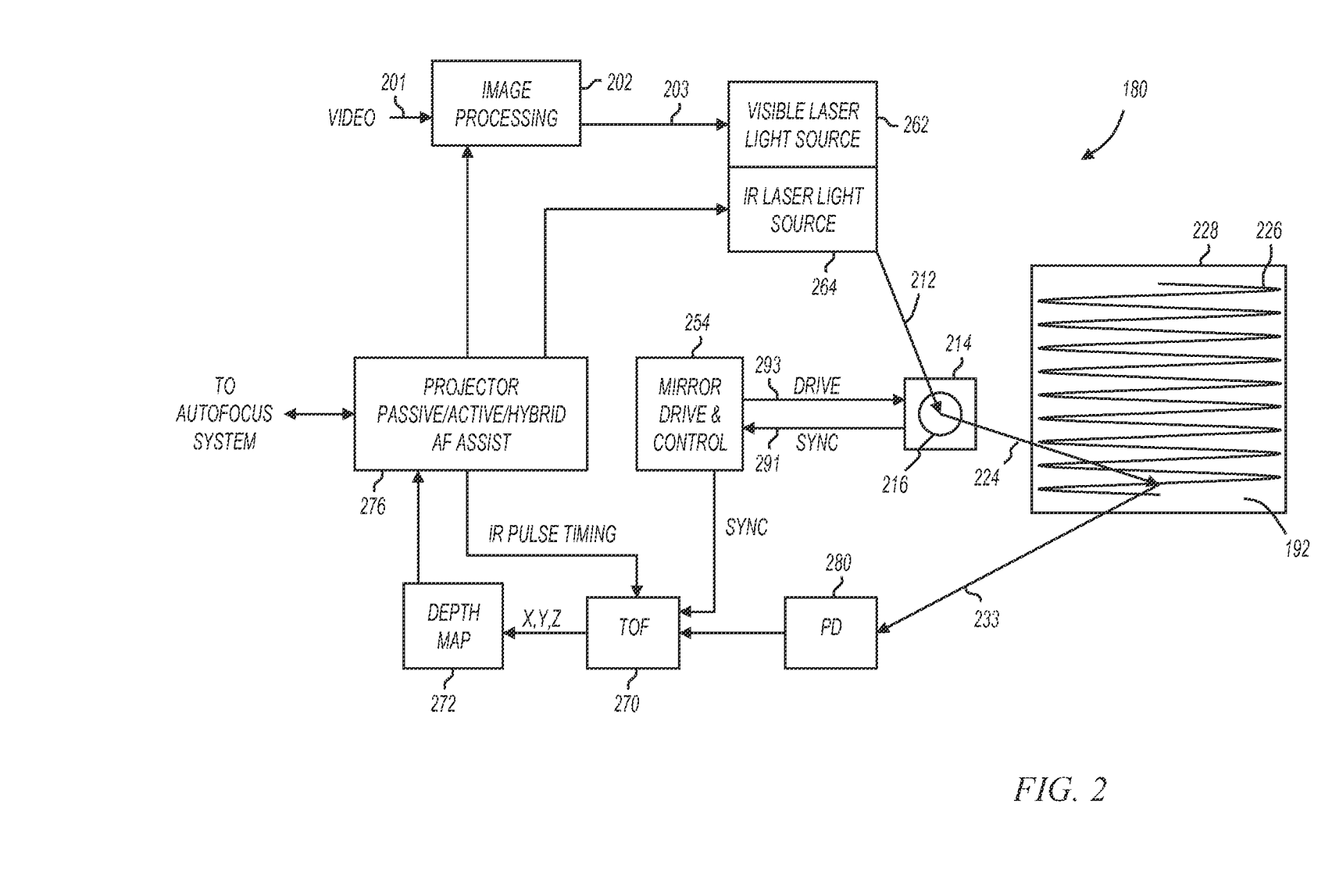
FIG. 2 shows a scanning laser projector with time of flight (TOF) data acquisition in accordance with various embodiments of the present invention.

FIG. 2 shows a scanning laser projector with time-of-flight (TOF) data acquisition in accordance with various embodiments of the present invention. Scanning laser projector 180 includes image processing component 202, light sources 262 and 264, scanning platform 214 with scanning mirror 216, and mirror drive and control circuit 254. Scanning laser projector 180 also includes photodetector (PD) 280, time-of-flight (TOF) detection circuit 270, depth map storage 272, and projector passive/active/hybrid autofocus assist control circuit 276.

Light sources 262 and 264 may be laser light sources such as laser diodes or the like, capable of emitting a laser beam 212. The beam 212 impinges on a scanning platform 214 which is part of a microelectromechanical system (MEMS) based scanner or the like, and reflects off of scanning mirror 216 to generate a controlled output beam 224. A scanning mirror drive and control circuit 254 provides one or more drive signal(s) 293 to control the angular motion of scanning mirror 216 to cause output beam 224 to generate a raster scan 226 on a projection surface 228. In operation, light sources 262 and/or 264 produce light pulses and scanning mirror 216 reflects the light pulses as beam 224 traverses raster scan 226.

In some embodiments, raster scan 226 is formed by combining a sinusoidal component on the horizontal axis and a sawtooth component on the vertical axis. In these embodiments, controlled output beam 224 sweeps back and forth left-to-right in a sinusoidal pattern, and sweeps vertically (top-to-bottom) in a sawtooth pattern with the display blanked during flyback (bottom-to-top). FIG. 2 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern.

Although scanning mirror 216 is shown as a single mirror that scans in two dimensions, this is not a limitation of the present invention. For example, in some embodiments, mirror 216 is replaced by two mirrors, one scanning in one dimension, and a second scanning in a second dimension.

In operation, mirror drive and control circuit 254 provides drive signal(s) 293 to control the angular motion of scanning mirror 216. In some embodiments, scanning mirror 216 includes one or more sensors to detect the angular position or angular extents of the mirror deflection (in one or both dimensions), and this information is provided back to mirror drive and control circuit 254 as one or more sync signals 291. In these embodiments, mirror drive and control circuit 254 includes a feedback loop to modify the drive signals in response to the measured angular deflection of the mirror.

Mirror drive and control circuit 254 is implemented using functional circuits such as phase lock loops (PLLs), filters, adders, multipliers, registers, processors, memory, and the like. Accordingly, mirror drive and control circuit 254 may be implemented in hardware, software, or in any combination. For example, in some embodiments, control circuit 254 is implemented in an application specific integrated circuit (ASIC). Further, in some embodiments, some of the faster data path control is performed in an ASIC and overall control is software programmable.

In some embodiments, light source 262 sources visible light. For example, light source 262 may include sources of red, green, and blue laser light. In these embodiments, visible light sources 262 are modulated to produce color pixels that are used to create an image as output beam 224 traverses raster scan 226.

Image processing component 202 receives video data on node 201 and produces pixel data on node 203 used to drive light source(s) 262 when pixels are to be displayed. The video data on node 201 represents image source data that is typically received with pixel data on a rectilinear grid, but this is not essential. For example, video data on node 201 may represent a grid of pixels at any resolution (e.g., 640×480, 848×480, 1920×1080). Raster scan 226 does not necessarily align with the rectilinear grid in the image source data, and image processing component 202 operates to produce display pixel data that will be displayed at appropriate points on the raster pattern. For example, in some embodiments, image processing component 202 interpolates vertically and/or horizontally between pixels in the source image data to determine display pixel values along the scan trajectory of the raster pattern.

In some embodiments, light source 264 sources nonvisible light such as infrared (IR) light. In these embodiments, PD 280 is able to detect the same wavelength of nonvisible light. For example, in some embodiments, light source 264 may be an infrared laser diode that produces light with a wavelength of substantially 808 nanometers (nm). The wavelength of light is not a limitation of the present invention. Any wavelength, visible or nonvisible, may be used without departing from the scope of the present invention.

Scanning laser projector 180 is referred to as including TOF data acquisition in part because it can acquire data using TOF detection circuit 270. Data acquired by TOF detection circuit 270 includes three dimensional data (x,y,z) that represents the position of object(s) in the field of view 192.

Time-of-flight (TOF) detection circuit 270 receives IR pulse timing information from autofocus assist control circuit 276 and compares it to the timing of a received IR pulse to determine the TOF of an IR pulse, thereby measuring the distance to the either the projection surface or to an autofocus target.

In some embodiments, TOF detection circuit 170 is able to measure the distance (z) using the TOF measurement, and is able to measure the x,y position by comparing the IR pulse timing with the sync information received from mirror drive and control circuit 254.

Depth map storage 272 receives three dimensional (3D) data from TOF detection circuit 270 for various points in the field of view and stores this data as a depth map. Depth map data is provided to autofocus assist control circuit 276.

Depth map storage 272 may be implemented using any suitable circuit structure. For example, in some embodiments, depth map storage 272 is implemented in a dual port memory device that can be written on one port and read on a second port. In other embodiments, depth map storage is implemented as data structures in a general purpose memory device. In still further embodiments, depth map storage 272 is implemented in an application specific integrated circuit (ASIC).

Projector passive/active/hybrid autofocus assist control circuit 276 controls the generation of visible or nonvisible light to assist with autofocus. For example, in some embodiments, autofocus control circuit 276 may command image processing component 202 to flood the field of view 192 with visible light to provide passive autofocus assist. In other embodiments, autofocus control circuit 276 may command IR laser light source 264 to flood the field of view 192 with IR light to provide passive autofocus assist. In still further embodiments, autofocus control circuit 276 may command IR laser light source 264 to project IR light at points within the field of view 192 to provide active autofocus assist in combination with TOF detection circuit 270.

Control circuit 276 also communicates with the various elements within apparatus 100 (FIG. 1) to provide autofocus assist. For example, control circuit 276 may provide depth map information to processor 150, or may provide distance information directly to autofocus control circuit 170.

Figure 3:
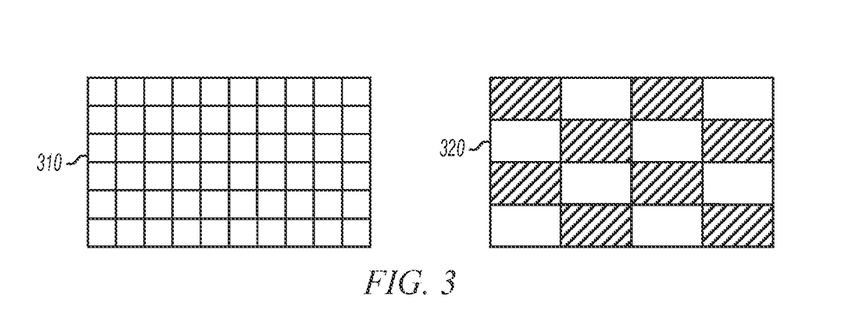
FIG. 3 shows autofocus assist image patterns in accordance with various embodiments of the present invention.

FIG. 3 shows autofocus assist image patterns in accordance with various embodiments of the present invention. Image pattern 310 represents a line pattern that may be projected into the field of view by an embedded scanning laser projector. For example, projector 180 (FIG. 1) may project such a pattern to provide additional contrast in an otherwise low-contrast image. The pattern may be illuminated using visible light or nonvisible light. For example, visible light source(s) 262 may be used to illuminate the image pattern at 310. Also for example, nonvisible light source(s) 264 may be used to illuminate the image pattern at 310.

Image pattern 320 represents a checkerboard pattern that may be projected into the field of view by an embedded scanning laser projector. For example, projector 180 (FIG. 1) may project such a pattern to provide additional contrast in an otherwise low-contrast image. The pattern may be illuminated using visible light or nonvisible light. For example, visible light source(s) 262 may be used to illuminate the image pattern at 320. Also for example, nonvisible light source(s) 264 may be used to illuminate the image pattern at 320.

In some embodiments, the image pattern projected consists of a constant brightness pattern across the field of view. For example, in some embodiments, a projected image pattern may be all white, all red, all green, all blue, all infrared, or any of the 16.7M colors supported by the laser projector's wide color gamut.

In some embodiments, autofocus assist image patterns include only horizontal features, only vertical features, or both horizontal and vertical features as shown in FIG. 3. Also in some embodiments, the autofocus assist image patterns may be dynamic and may change based on the scene being photographed. The camera's image analysis software can determine the optical autofocus assist pattern to be projected. For example, in some embodiments, the autofocus assist image pattern can be changed temporally from course to more fine as the focus system converges closer to the optimal focus setting; different autofocus assist image patterns may be overlaid over different subjects to be photographed; or the color of the autofocus assist image pattern may change based on various factors including the color of the objects to be overlaid with the pattern.

Figure 4:
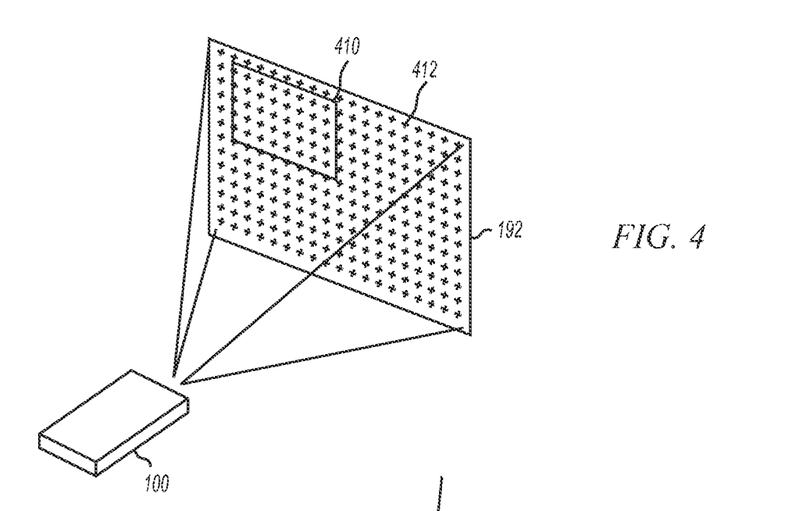
FIGS. 4 and 5 show LBS assisted autofocus operation in accordance with various embodiments of the present invention.
Figure 5:
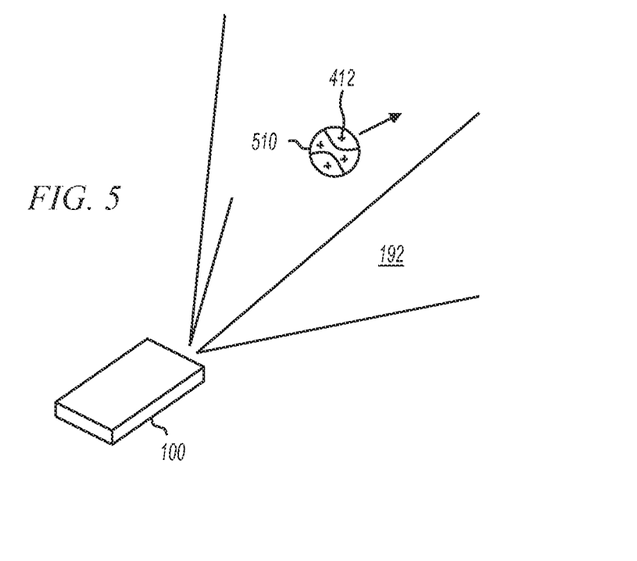

FIGS. 4 and 5 show LBS assisted autofocus operation in accordance with various embodiments of the present invention. As shown in FIG. 4, in some embodiments, TOF measurements may be made at many points 412 within the field of view 192. In some embodiments, TOF measurements are made at a subset of points, for example, within area 410. In some embodiments, the points 412 correspond to the depth map described above with reference to FIG. 2. An autofocus system may use any one point or any number of points 412 to determine the optimal focus.

As shown in FIG. 4, the LBS-based TOF system can measure distance to hundreds of points within the field of view. This compares favorably to existing systems, which are typically limited to a few focus points.

The large number of z-distance measurements can allow, for example, accurate distance measurement to small objects, such as the ball in a basketball scene. The camera's computer vision software could for example, then be programmed to continuously track and measure the distance to the ball and keep the camera focused on it. This is illustrated in FIG. 5 where points 412 illuminate ball 510.

Figure 6:
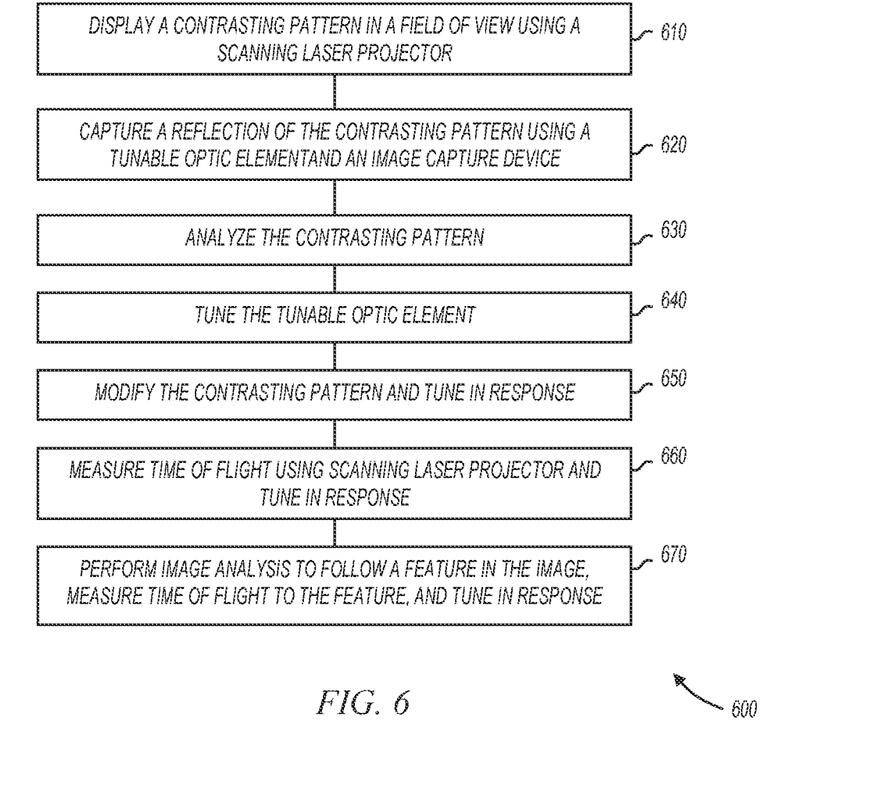
FIG. 6 shows a flow diagram of methods in accordance with various embodiments of the present invention.

FIG. 6 shows a flow diagram of methods in accordance with various embodiments of the present invention. In some embodiments, method 600, or portions thereof, is performed by an apparatus with LBS autofocus assist, embodiments of which are shown in previous figures. In other embodiments, method 600 is performed by a series of circuits or an electronic system. Method 600 is not limited by the particular type of apparatus performing the method. The various actions in method 600 may be performed in the order presented, or may be performed in a different order. Further, in some embodiments, some actions listed in FIG. 6 are omitted from method 600.

Method 600 is shown beginning with block 610. As shown at 610, a contrasting pattern is displayed in a field of view using a scanning laser projector. In some embodiments, this corresponds to projector 180 displaying an autofocus assist image pattern (FIG. 3) into a field of view. At 620, a reflection of the contrasting pattern is captured using a tunable optic element and an image capture device. For example, light from projector 180 may reflect off subjects in the field of view and image capture device 164 may capture an image after the reflected light has passed through tunable optics 162.

At 630, the contrasting pattern is analyzed. In some embodiments, this corresponds to autofocus sensors 160 performing an analysis at one or more points in the image. In other embodiments, this corresponds to processor 150 performing an image analysis and determining if the image is in focus.

At 640, the tunable optic element is tuned. In some embodiments, this corresponds to autofocus control circuit 170 tuning tunable optics 162 in response to information received from autofocus sensors 160, and in other embodiments, this corresponds to autofocus control circuit 170 tuning tunable optics 162 in response to information received from processor 150.

At 650, the contrasting pattern is modified and the tunable optics 162 are tuned in response. In some embodiments, the contrasting pattern is modified to provide more contrast in a target location within the field of view. For example, a target object may be identified within the field of view and the contrasting pattern may be modified to provide autofocus assist at the target object. In other embodiments, the contrasting pattern is modified as to color or shape to provide additional contrast in the image.

At 660, a time of flight is measured at one or points within the field of view and the tunable optics are tuned in response. In some embodiments, this corresponds to a TOF detection circuit within a scanning laser projector (FIG. 2) measuring times of flight to one or more points in the field of view. For example, FIG. 4 shows points 412 in the field of view at which distances are measured using a TOF detection circuit.

At 670, image analysis is performed to follow a feature in the image, a time of flight is measured to the feature, and the tunable optics are tuned in response. In some embodiments, this corresponds to processor 150 receiving depth map information, and following a feature, such as a ball in the image based on z information. In other embodiments, this corresponds to processor 150 performing image contrast analysis to follow a feature. Once the (moving) location of the feature is identified, it can be illuminated with light (FIG. 5) for TOF determination and distance measurement.

FIG. 6 combines LBS assisted passive and active autofocus embodiments. In some embodiments, only LBS assisted passive autofocus is performed and in other embodiments, only LBS assisted active autofocus is performed.

Figure 7:
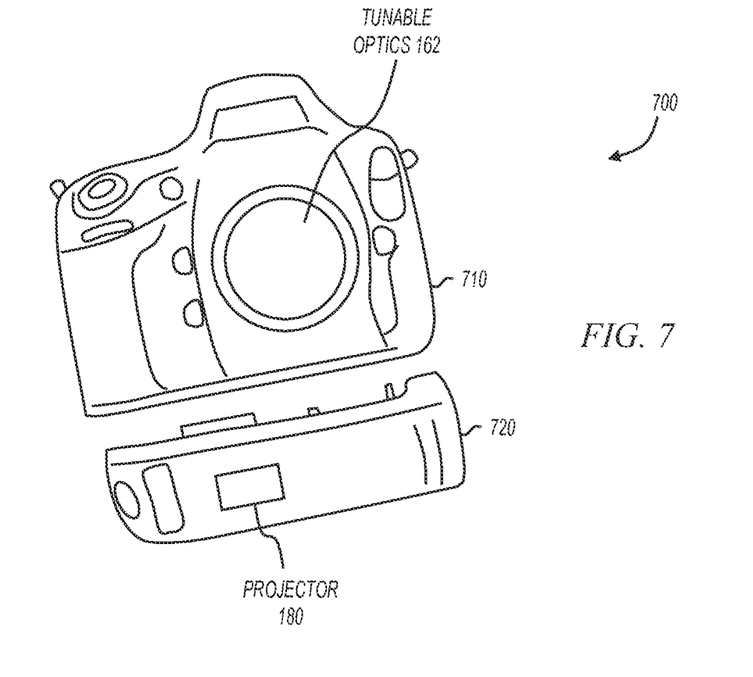
FIGS. 7-10 show various apparatus that include LBS assisted autofocus.

FIGS. 7-10 show various apparatus that include LBS assisted autofocus. FIG. 7 shows an apparatus 700, which is an example embodiment of apparatus 100 (FIG. 1). Apparatus 700 includes a camera 710 with a removable projector module 720. Tunable optics 162 correspond to a lens of the camera, and projector 180 is included in removable projector module 720. In some embodiments, a dedicated autofocus assist lamp is omitted from apparatus 700, in part because projector 180 provides autofocus assist.

Figure 8:
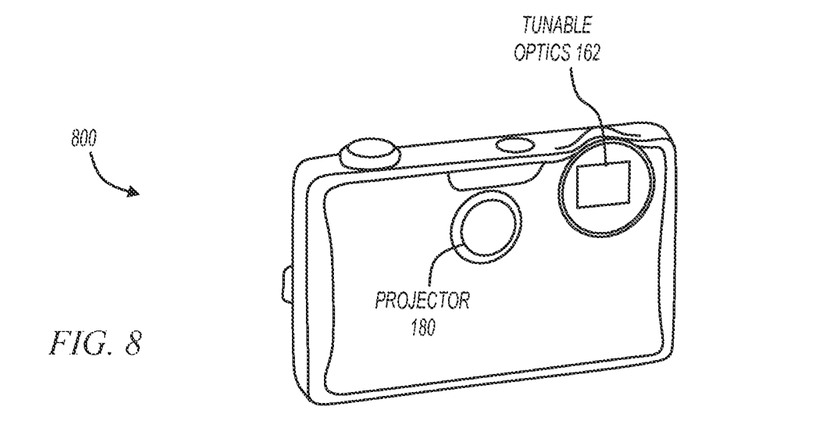

FIG. 8 shows an apparatus 800, which is an example embodiment of apparatus 100 (FIG. 1). Apparatus 800 is a camera that includes tunable optics 162 and projector 180 in a single housing. In some embodiments, a dedicated autofocus assist lamp is omitted from apparatus 800, in part because projector 180 provides autofocus assist.

Figure 9:
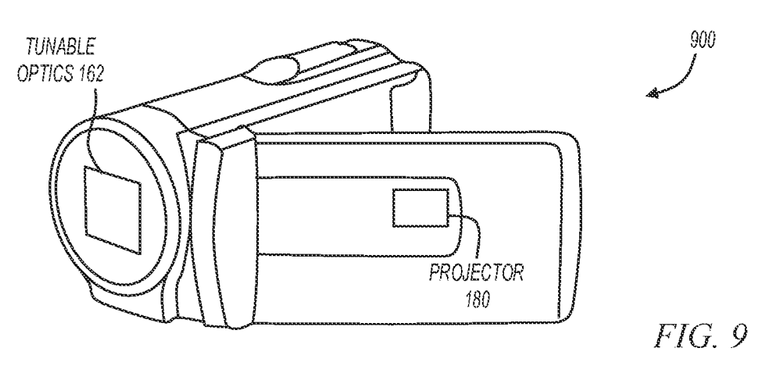

FIG. 9 shows an apparatus 900, which is an example embodiment of apparatus 100 (FIG. 1). Apparatus 900 is a video camera that includes tunable optics 162 and projector 180 in a single housing. In some embodiments, a dedicated autofocus assist lamp is omitted from apparatus 900, in part because projector 180 provides autofocus assist.

Figure 10:
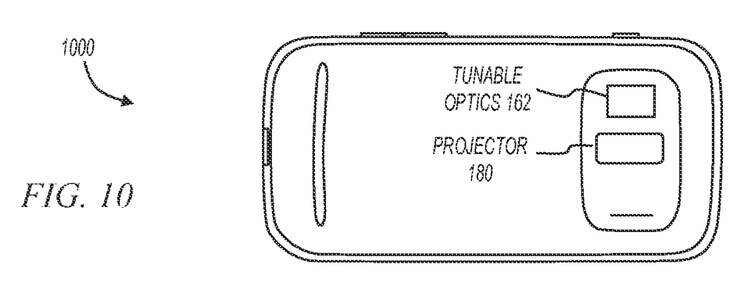

FIG. 20 shows an apparatus 1000, which is an example embodiment of apparatus 100 (FIG. 1). Apparatus 1000 is a mobile phone that includes tunable optics 162 and projector 180 in a single housing. In some embodiments, a dedicated autofocus assist lamp is omitted from apparatus 1000, in part because projector 180 provides autofocus assist.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a tunable optic system to focus light received from a field of view;
   an image capture device coupled to the tunable optic system;
   a scanning laser projector to emit laser light into the field of view;
   an autofocus sensor to receive reflected laser light from the field of view;
   an autofocus control circuit to tune the tunable optic system; and
   a processor coupled to the autofocus sensor and the autofocus control circuit, the processor configured to provide multiple different contrasting patterns to the scanning laser projector to emit into the field of view, and to command the autofocus control circuit to tune the tunable optic system in response to received reflected laser light corresponding to each contrasting pattern.

2. The apparatus of claim 1 wherein the scanning laser projector is configured to emit visible laser light.

3. The apparatus of claim 1 wherein the scanning laser projector is configured to emit nonvisible laser light.

4. The apparatus of claim 1 wherein the apparatus comprises a mobile phone.

5. The apparatus of claim 1 wherein the apparatus comprises a camera.

6. An apparatus comprising:
   a tunable optic system to focus light received from a field of view;
   an image capture device coupled to the tunable optic system;
   a scanning laser projector to emit laser light into the field of view, the scanning laser projector including a time-of-flight (TOF) detection circuit to determine distances to multiple points within the field of view;
   an autofocus control circuit to tune the tunable optic; and
   a processor coupled to the scanning laser projector, the image capture device and the autofocus control circuit, the processor configured to provide multiple different contrasting patterns to the scanning laser projector to emit into the field of view, and to command the autofocus control circuit to tune the tunable optic system in response to images received by the image capture device corresponding to each contrasting pattern, and in response to distance information received from the scanning laser projector.

7. The apparatus of claim 6 wherein the scanning laser projector measures TOF using infrared light.

8. The apparatus of claim 6 further comprising an autofocus sensor to perform passive focus detection, wherein the autofocus control circuit is further responsive to the autofocus sensor.

9. The apparatus of claim 8 wherein the scanning laser projector is configured to flood the field of view with laser light to aid in passive focus detection.

10. The apparatus of claim 6 wherein the processor is configured to perform contrast analysis of the images received by the image capture device.

11. A method comprising:
displaying a first contrasting pattern in a field of view using a scanning laser projector;
capturing a reflection of the first contrasting pattern using a tunable optic element and an image capture device;
analyzing the reflection of the first contrasting pattern;
tuning the tunable optic element in response to analyzing the reflection of the first contrasting pattern;
displaying a second contrasting pattern in the field of view using the scanning laser projector;
capturing a reflection of the second contrasting pattern using the tunable optic element and the image capture device;
analyzing the reflection of the second contrasting pattern; and
tuning the tunable optic element in response to analyzing the reflection of the second contrasting pattern.

12. The method of claim 11 wherein the second contrasting pattern is more fine than the first contrasting pattern.

13. The method of claim 11 wherein the second contrasting pattern includes different patterns across the field of view.

14. The method of claim 11 wherein the first and second contrasting patterns comprise different colors across the field of view.

15. The method of claim 11 wherein the first and second contrasting patterns comprise nonvisible light.

16. The method of claim 11 further comprising measuring a time-of-flight to at least one point in the field of view using the scanning laser projector and tuning the tunable optic element in response.

17. The method of claim 11 further comprising performing image analysis to follow a feature in the image, measuring a time-of-flight to the feature, and tuning the optical element in response.

* * * * *